United States Patent
Fdida et al.

(10) Patent No.: US 7,596,626 B2
(45) Date of Patent: Sep. 29, 2009

(54) METHOD AND COMPUTER SYSTEM FOR TRIGGERING AN ACTION ON DIGITAL COMMUNICATION DATA

(75) Inventors: Serge Fdida, Alfortville (FR); Gautier Harmel, Paris (FR); Eric Horlait, Amiens (FR); Guy Pujolle, Chatillon (FR); Jérome Tollet, Paris (FR)

(73) Assignee: QOSMOS, Amines (FR)

( * ) Notice: Subject to any disclaimer, the term of this patent is extended or adjusted under 35 U.S.C. 154(b) by 609 days.

(21) Appl. No.: 10/535,380

(22) PCT Filed: Nov. 24, 2003

(86) PCT No.: PCT/FR03/03473

§ 371 (c)(1), (2), (4) Date: May 19, 2005

(87) PCT Pub. No.: WO2004/051965

PCT Pub. Date: Jun. 17, 2004

(65) Prior Publication Data

US 2006/0048206 A1    Mar. 2, 2006

(30) Foreign Application Priority Data

Nov. 28, 2002 (FR) .................................. 02 14960

(51) Int. Cl.
*G06F 15/16* (2006.01)
(52) U.S. Cl. .................. 709/232; 370/229; 370/465; 370/488; 370/497
(58) Field of Classification Search .................. 371/35; 709/205, 206, 223; 370/229, 235; 710/33
See application file for complete search history.

(56) References Cited

U.S. PATENT DOCUMENTS

| | | | |
|---|---|---|---|
| 5,793,954 A * | 8/1998 | Baker et al. | 709/250 |
| 6,157,955 A | 12/2000 | Narad et al. | 709/228 |
| 6,266,716 B1 * | 7/2001 | Wilson et al. | 710/33 |
| 6,463,470 B1 * | 10/2002 | Mohaban et al. | 709/223 |
| 6,744,729 B2 * | 6/2004 | Tinsley et al. | 370/229 |
| 7,027,400 B2 * | 4/2006 | O'Neill | 370/235 |
| 7,385,924 B1 * | 6/2008 | Riddle | 370/235 |
| 2003/0041050 A1 * | 2/2003 | Smith et al. | 707/1 |

FOREIGN PATENT DOCUMENTS

| | | |
|---|---|---|
| EP | 1 180 882 A2 | 2/2002 |
| WO | WO 01/22686 A1 * | 3/2001 |

* cited by examiner

*Primary Examiner*—Dustin Nguyen
(74) *Attorney, Agent, or Firm*—Occhiuti Robhlicek & Tsao LLP

(57) ABSTRACT

The invention concerns a digital processing system fed by at least one filter having three possible states resulting from one or more conditions on one or more protocol attributes, specified for a semantic stream. Each protocol attribute is specified by an ordered sequence of protocol names used in the semantic stream and a parameter name carried by a protocol whereof the name is indicated in the ordered sequence of protocol names. The digital processing device comprises a filtering engine which applies the filter on the communication data until the data provide protocol attribute values wherefrom results a valid or invalid state of the filter and an action motor which triggers the action when the state of the filter is valid.

8 Claims, 5 Drawing Sheets

FIG. 2

| Measurement links | | —61 |
|---|---|---|
| Statement 1 | Fi | |
| Statement 2 | Fj | |
| Statement i | F2 | |
| Statement k | F1 | |
| Statement q | def | |

66  67

| Firewall links | | —62 |
|---|---|---|
| Rejects | Fk | |
| discards | Fj | |
| accepts | def | |

66  67

| Service links | | —63 |
|---|---|---|
| Queue 20 Kb/s | Fn | |
| Queue 50 Kb/s | F1 | |
| Queue 10 Kb/s | F3 | |
| Queue 16 Kb/s | Fi | |
| Queue 20 Kb/s | def | |

66  67

64—

| Filters | |
|---|---|
| F1 | And ( Or (R1,not Ri)) |
| F2 | Not (And(Rm,Or(R2, |
| F3 | Xor ( Ri, And (R2,not |
| Fi | And(Rk,And(R3,not Ri)) |
| Fj | Or(Rj,And(R1,AND( Ri)) |
| Fk | And ( Rk, Or (R1,not |
| Fn | Or (And (R1,not Ri)) |

68  69

65—

| Rules | | |
|---|---|---|
| R1 | Attribute1 = value1 | N |
| R2 | Attribute2 < value1 | A |
| R3 | Attribute1 != value3 | A |
| R4 | Attribute1 = value1 | N |
| Ri | Attribute i - value x | N |
| Rj | Attribute j >= value j | N |
| Rk | Attribute k > value2 | A |
| Rm | Attribute3 <= value i | N |

| Connection link | | 53 |
|---|---|---|
| Statement i | F2 | |
| Statement k | F1 | |
| Statement q | def | |
| Rejects | Fk | |
| Accepts | def | |
| Queue 50 Kb/s | F1 | |
| Queue 10 Kb/s | F3 | |
| Queue 20 Kb/s | def | |
|  |  | |
|  |  | |

49    48

| Filter states | | 54 |
|---|---|---|
| Fi | -1 | |
| Fj | -1 | |
| F2 | 1 | |
| F1 | 0 | |
| Fk | 0 | |
| F3 | 0 | |

47   46

| Rule states | | 55 |
|---|---|---|
| Rk | 0 | |
| R3 | -1 | |
| Rj | -1 | |
| R1 | -1 | |
| Rm | -1 | |
| Ri | 0 | |
| R2 | 1 | |

| And | -1 | 1 | 0 |
|---|---|---|---|
| -1 | -1 | -1 | -1 |
| 1 | -1 | 1 | 0 |
| 0 | -1 | 0 | 0 |

57

| Or | -1 | 1 | 0 |
|---|---|---|---|
| -1 | -1 | 1 | 0 |
| 1 | 1 | 1 | 1 |
| 0 | 0 | 1 | 0 |

56

| Xor | -1 | 1 | 0 |
|---|---|---|---|
| -1 | -1 | 1 | 0 |
| 1 | 1 | -1 | 0 |
| 0 | 0 | 0 | 0 |

55

| Name | -1 | 1 | 0 |
|---|---|---|---|
|  | 1 | -1 | 0 |

METHOD AND COMPUTER SYSTEM FOR TRIGGERING AN ACTION ON DIGITAL COMMUNICATION DATA

CROSS-REFERENCE TO RELATED APPLICATIONS

This application is the National Stage of International Application No. PCT/FR2003/003473, filed Nov. 24, 2003, which claims the benefit of French Patent Application Serial No. 02/14960, filed on Nov. 28, 2002. The contents of both applications are hereby incorporated by reference in their entireties.

FIELD OF THE INVENTION

The field of the invention is that of control and management of information streams which are transmitted in the form of digital communication data.

BACKGROUND OF THE INVENTION

By way of known examples may be cited routing, management of resources, quality of service, security control, observation of certain contents, and billing of use of the communication means.

Routing is essentially applied at the network level to steer the communication data from a sender to a receiver. In circuit switching, it is performed by signaling which establishes a fixed end-to-end physical link. In packet switching, an address such as an IP address, makes it possible to pass through several networks embodied by possibly different physical layers without it being necessary to monopolize a physical line for the entire communication. In cell switching such as afforded by the ATM protocol, the establishment of a virtual circuit reconciles the speed offered by circuit switching with the optimal utilization of physical resources that is offered by packet switching. Typically, routing relies essentially on predetermined network addresses based on concepts of geographical location. There is a movement in requirements toward growing abstraction of network services. Techniques exist which already provide solutions to some of these requirements, such as, for example, those of virtual local area networks (VLAN standing for Virtual Local Area Network). However, the actions performed by a router for steering data still remain broadly conditioned by relatively fixed criteria such as prior specifications of architecture and of addresses for allocating a virtual local area network to a predetermined enterprise. It may be desirable for a virtual network to be linked to a particular application, to a type of data or else to a specific service. Unfortunately, the adoption of such an approach is unfavorable by reason of its complexity of deployment and of administration.

The management of resources and of quality of service consists in performing actions such as those for allocating a throughput or a level of priority of transmission to a syntactic data flow. A syntactic flow corresponds to a set of packets identified by network, transport or even session level criteria. The management of resources and of quality of service based on recognition of syntactic flow is not satisfactory if one wishes to achieve it at application level as a function of a service provided such as the continuous restitution of music or of films (audio or video streaming), the membership of a virtual network, of a group of exchanges, a communicated content coding such as for example that prescribed by the G721 coding and sound compression standard, the identification of a user or of a keyword for purchasing bandwidth on a determined communication. The same syntactic flow can transport data of different types. For example, an http flow displayed on a client station exhibits firstly textual data to the detriment of the images which are displayed when the capacity of the system is progressively freed. An allocation of unique bandwidth to the whole of a syntactic flow is not satisfactory although a small bandwidth suffices for transmission of textual data and a large bandwidth is better suited for transmission of visual or audible data.

Security control comprises the actions performed on the digital communication data transmitted so as to reserve access for same or broadcasting to only authorized persons. Firewalls which prohibit or allow data packets as a function of recognition of network addresses such as IP, of transport ports such as TCP or UDP. Such criteria pose difficulties for the applications which use dynamically negotiated ports. For example, in the case of the FTP protocol, a command connection is first opened generally on the TCP21 port. This connection allows a client to connect up to a server, to navigate through the remote file system tree and to perform inquiries (GET) on the server. When the client performs an inquiry, the server informs the client of a particular port to which he must connect to recover the desired file, thereby opening a data connection. The transaction takes place on this dynamically negotiated port but it is impossible to recognize the FTP protocol by analyzing this connection since the latter has no particular header. Only the binary data of the file exchanged travel across. It is then necessary to analyze the complete content of the command session in order to ascertain all the data connections. The same holds for the number of protocols covered by the H.323 standard relating to multimedia systems and for real-time application connections (RTP). When an H.323 session is initiated, a dynamic port is allotted with the aid of the H.245 protocol relating to the user interface control, to define the RTP connection over which voice and/or video travel. It is possible to dispense with prior knowledge of the port since a particular header used for each voice packet makes it possible to recognize the RTP connection.

Among the security actions performed on digital communication data are also known, in the field of cryptography, those of encryption, signature, or authentication of messages. It is usually the application managing the messages which triggers the cryptographic actions. There also exist means of triggering cryptographic actions at the network level such as IPSEC, for example, to encrypt data sent over a wide area network from a local area network. The triggering criteria here still remain on flows of syntactic type. It is difficult to trigger a posteriori, independently of the application, actions of encryption or of authentication on digital communication data on the most sensitive parts of their content to save on computational resources, for example.

Observation of the contents (monitoring) is useful for performing statistics on the error rates, the information volumes conveyed or the meaning of the information exchanged. The control of behavior forms part of this type of communicating function. Here again, the choice of observing this or that content is made essentially per syntactic flow. The observation actions are sometimes even triggered on the whole set of communication data without any fine distinction with regards to what they relate to. More targeted observation actions would be useful for their sorting with a view to their utilization.

The problems alluded to hereinabove are found in other communication functions such as the billing of the use of communication means or the compressing of data. Generally, it is the application level which triggers the data compression and decompression actions. It is also possible to trigger a compression action at the transport level, for example, on all the communication data steered through a specially dedicated port. However, such an approach remains of a syntactic nature which is hardly or poorly suited to higher functional levels.

Moreover, each communication function generally forms the subject of a development and often of a specific deployment by previously defining the actions to be triggered and the syntactic flows to be considered. This lacks flexibility for widening the breadth of the communication functions.

BRIEF SUMMARY OF THE INVENTION

To summarize, the digital communication data generally include a header containing signals which code protocol information suitable for defining syntactic flows and signals which code application package level information, the latter often being dubbed useful data (or payload). For each communication function, actions are triggered on these communication data either at their source or upon their arrival at application package level, or in the course of transmission by recognition in the header part of known values to identify a syntactic flow.

Tailored parameterization of the applications, provided that the latter so permit, rapidly becomes constraining in terms of deployment vis-à-vis the multitude of applications implemented in an entity such as an enterprise or a computing site.

The rigidity induced by recognition of known values for identifying syntactic flows, is not always suitable, for example, in the case of dynamic negotiation of ports or when an action has to be performed only partially on a syntactic flow or commonly on several syntactic flows as a function of criteria of higher functional level, such that the requirement therefor may make itself felt in the services.

The aim of the invention is to be able to trigger actions on the communication data independently of the application or applications which are at the source thereof and to do so without being limited to a purely protocol-based analysis restricted to syntactic flows.

The aim of the invention is also to be able to develop and deploy with maximum flexibility, communication functions which group together action triggers.

The solution is to class the communication data by semantic flows, the triggering of each action being allocated to a given semantic flow.

Unlike a syntactic flow, a semantic flow groups together all the communication data which satisfy a common functional criterion to satisfy a given service. A syntactic flow may convey several different semantic flows. One and the same semantic flow may require several syntactic flows in order to be conveyed.

The benefit of semantic flow based classification is to be able to extend the action triggering criteria to infinity, a possibility which is of particular interest within the framework of distributed networks.

A subject of the invention is a method for triggering by means of a digital processing device, at least one action on digital communication data when they belong to one and the same semantic flow for which said action is designed.

The method is noteworthy in that it comprises steps in which:
  said device is fed with at least one filter having three possible states which result from one or more logical conditions on one or more protocol attributes specified for said semantic flow, a so-called valid state corresponding to protocol attribute values which confirm that said condition or conditions are satisfied, a so-called invalid state corresponding to protocol attribute values which confirm that said condition or conditions are not satisfied, a so-called uncertain state corresponding to an absence of protocol attribute values to confirm that said condition or conditions are or are not satisfied, each protocol attribute being specified by an ordered sequence of protocol names used in the semantic flow and by a parameter name conveyed by a protocol whose name is indicated in said ordered sequence of protocol names;
  the digital processing device applies the three-state filter to said communication data as long as these data have not afforded protocol attribute values other than those from which said uncertain state of the filter results;
  the digital processing device triggers said action when said valid state of the filter results from protocol attribute values afforded by the communication data.

In this method, the filter constitutes a reactive ingredient on the communication data which belong to one and the same semantic flow. This ingredient provides great flexibility in terms of classification of communication data by semantic flow. A user can adapt the protocol attributes to satisfy numerous requirements. For example, for any new protocol architecture, it is sufficient to specify the ordered sequence of protocol names used. The user can freely define through the name thereof the parameter which is suitable for the semantic flow on which he wishes to trigger actions. The user may add other semantic flows by simply creating other filters with, if required, other protocol attributes to feed the digital processing device.

It will be noted that the activity performed by the digital processing device is decoupled from a formulation of the filters with a view to defining various semantic flows.

Additional flexibility of adaptation of the method is provided when, to apply the filter to said communication data,
  the digital processing device successfully dispatches one of said protocol attributes to a protocol interface allocated to the protocol indicated in the ordered sequence of protocol names, until the state of the filter is valid or invalid or until all the protocol attributes have been dispatched,
  the protocol interface searches through the communication data for the value of the specified parameter and transmits this value to the digital processing device if it finds the former,
  the digital processing device evaluates the state of the filter which corresponds to the value or to the absence of value transmitted by the protocol interface.

This makes it possible to specialize the search for value of protocol attributes by protocol where the parameter is used and to simplify the design of the digital processing device.

Advantageously, each filter for feeding said digital processing device is defined by a logical combination of rules in a first table, each rule being defined in a second table by a verification expression comprising at least one comparison operator, an argument of which is the protocol attribute.

Particularly, to evaluate the state of the filter which corresponds to the value or to the absence of value transmitted by the protocol interface, the digital processing device evaluates the state of at least one rule in the logical combination as a function of the transmission of value and then the state given by the logical combination applied to the evaluated states of rules.

The communication data's membership of a semantic flow may vary over time. To cope with this circumstance, the method comprises a step in which the digital communication data are scanned so as to detect any change of value of a protocol attribute so as to make it possible to evaluate a change of state of the filter which corresponds to the change of value.

Another aspect of the invention is a computer system for triggering at least one action on digital communication data when they belong to one and the same semantic flow for which said action is designed.

The computer system is noteworthy in that it comprises:
  a digital processing device consisting of a filtering engine and of an actions engine;

a database for feeding the filtering engine with at least one filter having three possible states which result from one or more conditions on one or more protocol attributes specified for said semantic flow, at least one data structure for cataloguing a so-called valid state corresponding to protocol attribute values which confirm that said condition or conditions are satisfied, a so-called invalid state corresponding to protocol attribute values which confirm that said condition or conditions are not satisfied, a so-called uncertain state corresponding to an absence of protocol attribute values to confirm that said condition or conditions are or are not satisfied, each protocol attribute being specified by an ordered sequence of protocol names used in the semantic flow and by a parameter name conveyed by a protocol whose name is indicated in said ordered sequence of protocol names;

means for receiving communication data, useable by the filtering engine to apply each necessary filter to said communication data as long as these data have not afforded any protocol attribute value other than those from which said uncertain state of the filter results;

means of transmission of the communication data, useable by the action engine to trigger said action when said valid state is contained in the data structure.

This computer system in which the filtering engine and the action engine constitute two decoupled elements of a digital processing device, makes it possible to implement the method in accordance with the invention.

The computer system may easily be adapted to any appearance of new protocol within the upgrading of communication technologies when it comprises a protocol interface allocated to each useable protocol in the semantic flow, and devised to receive from the filtering engine, the protocol attributes defined for the protocol to which the protocol interface is allocated;

the protocol interface being devised so as to search through the communication data for the value of the specified parameter and to transmit this value to the filtering engine if it finds the former, the filtering engine being devised so as to evaluate the state of the filter which corresponds to the value or to the absence of value transmitted by the protocol interface.

It is then sufficient to add a protocol interface specially designed for this new protocol without having to reconstruct the whole of the system.

Advantageously, the database comprises a first table which contains a logical combination of rules for each filter, and a second table which contains for each rule, a verification expression comprising at least one comparison operator, an argument of which is the protocol attribute.

Particularly, to evaluate the state of the filter which corresponds to the value or to the absence of value transmitted by the protocol interface, the filtering engine is devised so as to evaluate the state of at least one rule in the logical combination as a function of the transmission of value and then the state given by the logical combination applied to the evaluated states of rules.

A beneficial aspect of the computer system is in the database which comprises at least a third table containing several names of actions each designed for a different semantic flow with which a specific filter is associated.

This makes it possible to trigger one or more actions which are suitable for each semantic flow.

BRIEF DESCRIPTION OF THE DRAWINGS

FIG. 2 shows a database structure for the computer system of FIG. 1;

FIG. 3 represents truth tables particular to the invention;

FIG. 6 shows a data structure of the computer system in a state during execution of the method.

DETAILED DESCRIPTION OF THE INVENTION

Figure 1:
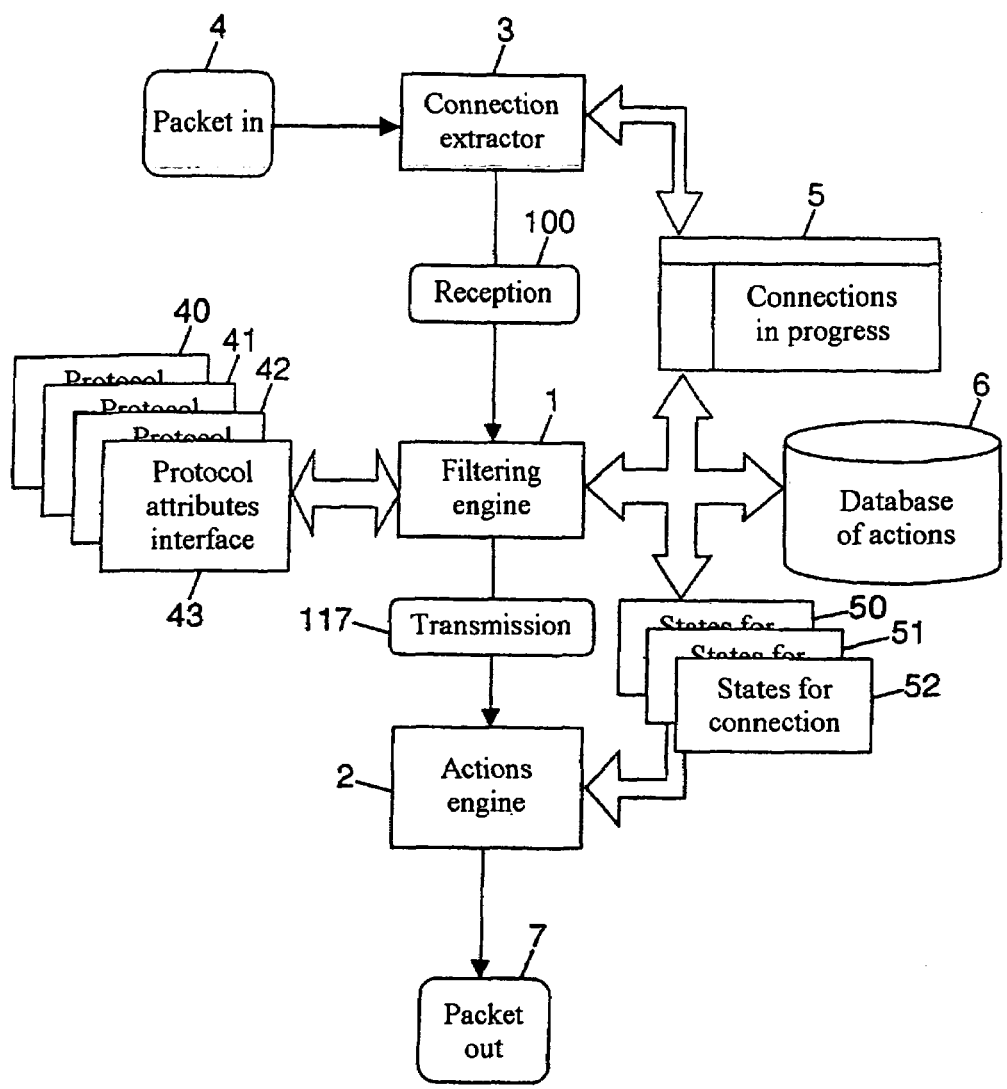
FIG. 1 is a computer system diagram in accordance with the invention.

FIG. 1 depicts a computer system architecture diagram which implements the invention.

Digital communication data are submitted to a filtering engine 1 devised as explained hereinafter, to analyze these digital communication data, before forwarding them to an actions engine 2.

In the example depicted in FIG. 1, the digital communication data originate from a connection extractor 3 which receives from an input coupler 4, the digital communication data in packet form. The connection extractor 3 is devised to extract from each packet received, information which makes it possible to identify a current connection to which the packet received belongs. This information typically comprises an ordered sequence of protocol names for at least one or more of the first protocol names of the ordered sequence, a source address and a destination address. The ordered sequence of protocol names comprises protocol names used by the protocol stack of the connection to which the packet belongs. Each packet does not necessarily contain the entirety of the information for completely identifying the connection but generally a minimum of information which makes it possible to distinguish the current connection to which the packet received belongs, from other connections to which other packets belong. As and when packets are received, the connection extractor 3 is devised to extract from the packet received, the connection identification information so as to store it in a row of the table 5 of current connections, which corresponds to the connection to which the packet belongs. Thus, the connection extractor 3 progressively enriches the table 5 so as to identify on each row, a current connection in the most complete manner possible. Each packet received is thereafter submitted to the filtering engine 1 with a reference to the row of the table 5 which contains the information for identifying the current connection in associative correspondence with the distinguishing information of this packet.

The state of the art such as that disclosed in the publication IEEE/ACM Transactions On Networking, volume 6, Issue 2 (April 1998), Peter Newman et al., pages 117-129, makes it possible to embody the connection extractor 3 without it being necessary here to describe it in greater detail. Patent application FR0209599 teaches, for example, a protocol recognition and analysis method for operating the connection extractor 3 with enhanced performance.

The connection extractor 3 is useful, for example, when the computer system which is the subject of the invention, is integrated into a proxy server type equipment, situated at a communication network node for diverting onto the input coupler 4, the current-connection packets which contain the digital communication information to be submitted to the filtering engine 1.

The connection extractor 3 can furthermore be useful but without being indispensable, when the computer system which is the subject of the invention is integrated into equipment which itself generates the digital communication data of a connection and which may, through other means, have access to the communication protocol stack's connection identification information that it itself manages.

The submission of the digital communication data by packets, as and when they are received on the input coupler 4 or as and when they are generated by the equipment which hosts the system concerned, makes it possible to process the communication data in real time without having to wait for the total transmission thereof and without having to store them as and when they are received or generated. However, the system is also beneficial with respect of a posteriori (BATCH) processing on a set of digital communication data of a connection which might have been logged.

The filtering engine 1 is devised to access an actions database 6 now described with reference to FIG. 2.

The database 6 comprises one or more link tables 61, 62, 63, at least one filter table 64 and at least one rule table 65.

Each row of a link table associates a filter name with an action name. The action names are indexed in order of decreasing priority so that the name of the highest priority action is indexed in the first row and the name of a default action is indexed in the last row of the link table. The default action is an action to be triggered in the case where none of the actions of higher priority is to be triggered. The default action may possibly be a null action, that is to say, one with no effect.

Table 61 represented here is a measurement links table, designed to make it possible to observe (monitoring) a behavior or a content of the digital communication data. Various metrics may define what is to be observed in the digital communication data. By way of illustrative example, mention may be made of the evaluation (or measurement) of volume of communication data expressed as a number of bytes or of multiples of bytes, forecasting as regards a forthcoming volume, a duration of communication, a throughput expressed in bytes per second or as a multiple of bytes per second, requested for the future. Mention may also be made of the tapping off of information of a particular type such as character strings to be monitored for a meaning that they give, behavior control regarding latencies, transfer errors or blockages.

To each name indexed in column 66 of table 61 there corresponds an action designed to satisfy one or more metrics. For example, "statement 1" corresponds to an action which aggregates a number representative of a quantity of bytes per packet and which stores a duration separating two successive packet arrivals, to satisfy a metric for evaluating volume and latency. The name "statement 2" corresponds to an action which aggregates a number of bytes per packet, to satisfy a volume evaluation metric. Again, "statement i" corresponds to an action which does nothing. With the name indexed in column 66 of the last row of table 61 is associated a particular name "def" which indicates the end of the table 61 and that the name indexed is that of an action to be triggered by default.

A filter name is associated in column 67, with each action name of column 66. Each filter named has the function of recognizing a set of communication data which belongs to one and the same semantic flow. A semantic flow is a stream of communication data to which a user of the system accords a particular meaning. This meaning may be of physical level for example if the user makes it refer to a place for receiving or for sending the communication data, to a date or to a transmission routing. This meaning may be of application package level if the user makes it refer to a particular application, to a type of application or to an application user. This meaning may also be of any combined physical, application package and/or intermediate level depending on the object to which the user of the system accords a meaning. One or more connections may belong to one and the same semantic flow. Likewise, a connection may belong to several semantic flows. Thus, each action is associated with a semantic flow for which the action is to be triggered.

Table 62 represented here is a so-called firewall link table, designed to make it possible to authorize or prohibit a transfer of digital communication data of one and the same semantic flow.

To each name indexed in column 66 of table 62 there corresponds an action designed to act on the digital communication data as a function of the authorization or of the prohibition of transfer of these data. For example, "rejects" corresponds to an action which blocks the transfer of the data to their receiver and informs the sender of this blockage. The name "discards" corresponds to an action which destroys the communication data without informing the sender. For example, "accepts" corresponds to an action which transmits the digital communication data to the end receiver without modifying them.

In table 62, a filter name is also associated in column 67 with each action name of column 66. A filter name of column 67 in table 62 may be identical to a filter name of column 67 in table 61 when a measurement action and a firewall action are suitable for one and the same semantic flow. A filter name of column 67 in table 62 may be different from the filter names of column 67 in table 61 where digital communication data belong to different semantic flows as regards their observation and as regards their authorization or prohibition of transfer. One and the same action name may be indexed on several rows of the link table when the named action is applicable to several different semantic flows. On the other hand, a filter name is associated only once at most in each link table since it would be inconsistent to trigger incompatible actions with respect to one and the same semantic flow. With the name indexed in column 66 of the last row of table 62 is associated a particular name "def" which indicates the end of the table 62 and that the name indexed is that of a rule to be triggered by default.

Table 63 represented here is a service link table designed to allocate various transfer throughputs to the digital communication data.

To each name indexed in column 66 of table 63 there corresponds an action designed to allocate a transfer throughput to certain of the digital communication data as a function of a predetermined quality of service for these data. The action consists generally in steering the communication data as and when they are received to a wait queue devised in a known manner so as to resend the data while best complying with the throughput specified for this wait queue. For example "queue 20 Kb/s" corresponds to an action which steers data to the wait queue with a transfer throughput of 20 Kb/s. The name "queue 50 Kb/s" corresponds to an action which steers data to the wait queue with a transfer throughput of 50 Kb/s. And "queue 10 Kb/s" corresponds to an action which steers data to the wait queue with a transfer throughput of 10 Kb/s.

In table 63, a filter name is also associated in column 67 with each action name of column 66.

There may be other link tables (not represented) such as a compression or decompression link table, a cryptographic link table, a routing link table or any other link table on the model of the link tables represented according to the processing that the user of the system wishes to have performed on the digital communication data as a function of semantic flows to which these data may belong. In column 66 of a compression link table, it is then possible to find names of actions corresponding to various compression rates to be applied to the communication data. In column 66 of a cryptographic link table, it is then possible to find names of actions corresponding to various encryption or authentication keys to be applied to the communication data. In column 66 of a cryptographic link table it is then possible to find names of actions corresponding to various destination addresses to which to resteer the communication data.

Each row of the filter table 64 associates with a filter name indexed in column 68, a logical combination of rules that is indexed on one and the same row in column 69. Each filter name indexed in column 67 of a link table is indexed once only in column 68 of table 64, with the possible exception of the name "def" which in fact corresponds to a tautology.

The logical combinations of column 69 use logical operators having three states defined in accordance with truth tables 55, 56, 57, 58 explained with reference to FIG. 3. An argument of a logical operator has three possible states, an invalid state indicated by the value −1, a valid state indicated here by the value 1 and an uncertain state indicated by the value 0.

Table 58 is the truth table of the "AND" logical operator which gives the valid state for two arguments in the valid state, the invalid state for an argument in the invalid state and which gives the uncertain state in other cases.

Table 57 is the truth table of the "OR" logical operator which gives the valid state for an argument in the valid state, the invalid state for two arguments in the invalid state and which gives the uncertain state in other cases.

Table 56 is the truth table of the "XOR" logical operator (exclusive or) which gives the valid state for an argument in the valid state and an argument in the invalid state, the invalid state for two arguments in the invalid state or two arguments in the valid state and which gives the uncertain state in other cases.

Table 55 is the truth table of the "NOT" unary logical operator which gives the valid state for an argument in the invalid state, the invalid state for an argument in the valid state and which gives the uncertain state for an argument in the uncertain state.

In column 69 of table 64 represented in FIG. 2, a logical combination commences with a logical operator applicable to one or two arguments. Each argument is itself a rule name or a logical combination so as to describe a tree of logical operations whose branches all terminate in a rule name.

The rule names used in column 69 of table 64 are indexed once and once only in a column 59 of table 65. The rule table 65 associates with each rule name a verification expression regarding a protocol attribute, which expression is contained in column 60 on one and the same row as that of the rule name contained in column 59. The rule table is improved by associating with each rule name, an indication of natural or antinatural sense, contained in column 39 on one and the same row as that of the rule name contained in column 59. The natural sense indicates that the protocol attribute value is extractable from communication data which belong to a current connection for which the rule is activated. The antinatural sense indicates that the protocol attribute value is extractable from communication data which belong to a peer connection of the current connection for which the rule is activated.

A protocol attribute is a parameter conveyed by a given protocol within a protocol stack. Preferably, each protocol attribute is specified by three syntactic elements. The first syntactic element comprises a string of protocol names where possibly one or more * characters indicate that any name or any part of a string of names, is suitable. The second syntactic element comprises a mark for labeling the protocol name which uses the parameter in the string, for example a placing between brackets of this protocol name or by default the quality of last name in the string. The third syntactic element comprises the parameter name used. For example, the attribute *.ip.ip:saddr represents the source address of an encapsulated IP packet, the attribute *.[ip].ip:saddr represents the source address of an IP packet of lowest level. A parameter name may designate a source or destination port number of the TCP and UDP protocols. A parameter name may also designate a host server name for the http protocol, a transfer throughput requested, an explicit protocol name transported or else a subnet expression such as determined by SNET.

The parameter may relate to any part of the digital communication data. The parameter does not necessarily relate to the signals which code protocol information suitable for defining syntactic flows. The parameter may also relate to the useful data such as previously named.

Advantageously, the protocol attributes are types so as to allow the system to perform logical, arithmetic and comparative operations generic to the whole set of protocols supported. Mention may be made of the following types: signed/unsigned/8, 16, 32, 64 bit integer, Mac address, IP address/subnet mask, character string, time unit, binary string. For example, the port of a UDP packet, specified by BASE.*.UPP:SPORT, is of type unit16 for 16-bit unsigned integer. An email address of the IMAP protocol, specified by *.IMAP:SENDER is defined by a character string.

A rule is a condition on a protocol attribute. The state of a rule is appropriate for the whole set of digital communication data of one and the same connection. The verification expression involves a comparison operator that operates on a value of the protocol attribute concerned as a function of its type, such as =for an equality, >, <, >=, <=for an order relation, !=for an inequality, ~ for an operator for validating a regular expression.

In the example presented in FIG. 2, the rule named R1 is in the valid state if the protocol attribute named Attribute1 has a value equal to value1, in the invalid state if the values are different and in the uncertain state if the value of the protocol attribute is not known. The rule named R2 is in the valid state if the protocol attribute named Attribute 2 has a value strictly less than value1, in the invalid state if the value of the protocol attribute is not strictly less than value1 and in the uncertain state if the value of the protocol attribute is not known. Thus, table 65 defines in a similar manner the whole set of rules useable in table 64. For example, the rule named Ri is in the valid state if the protocol attribute named Attribute i has a value which satisfies a regular expression of value X. Among the known regular expressions, mention may be made by way of illustration of those expressed in the form of character strings which comprise special characters which may be replaced with a character or a string of any characters, which indicate a format (presence of an integer, of a date, of a financial value) or which reference a data type (number, address, character string), in the invalid state if the values do not satisfy the regular expression and in the uncertain state if the value of the protocol attribute is not known.

It is remarked that the filters are logical rule functions. To validate a filter, a possible solution consists in having the filter interpreted by the filtering engine whenever the filter is called.

Advantageously, the filters are previously compiled in binary format in the form of a more easily executable syntactic tree. For example, the names of rules are each replaced by a pointer in binary format directly on the row of the table 65 which corresponds to the rule name. The syntactic tree is itself optimized to reduce the memory space and to increase the execution speed.

The contents of tables 61 to 65 may preexist in the database 6. Advantageously, the database 6 is coupled to a man/machine interface devised to allow the user of the system to enrich the content of these tables on the basis of and beyond a preexisting content, or even an initially empty content.

In order to allow the user to define a new action to be triggered for a particular semantic flow, the man/machine interface is devised so as to propose in the form of a dropdown menu, a first empty or nonempty nomenclature of existing names of link tables and to which is attached a first option to create a new link table name. The man/machine interface is devised to open a first window when the user selects the first create option, so as to add to the first nomenclature a link table name that the user enters into the window and so as to generate in the database 6, a new initially empty link table named by the name entered.

The man/machine interface is devised so as to propose in the form of a dropdown menu after selection or addition of a link table name in the first nomenclature, a second empty or nonempty nomenclature of existing names of actions in the link table selected or added. A second option to create a new action name is attached to the second nomenclature in the dropdown menu. The man/machine interface is devised so as to open a second window when the user selects the second create option, so as to add to the second nomenclature an action name that the user enters in the window and so as to generate in the database 6, a date structure which defines the action named by the name entered. The man/machine interface is devised so as to insert according to an order of priority defined by the user, the action name, selected or created in the current link table.

The man/machine interface is devised so as to propose in the form of a dropdown menu after selection or insertion of an action name into the second nomenclature, a third empty or nonempty nomenclature of existing filter names in the filter table 64. A third option to create a new filter name is attached to the third nomenclature in the dropdown menu. The man/machine interface is devised so as to open a third window when the user selects the third create option, so as to add to the third nomenclature a filter name that the user enters in the window and so as to generate in column 69 of the table 64, a logical combination which defines the filter named by the name entered. The man/machine interface is devised to associate with the action name inserted into the link table, the filter name, selected or created in the third nomenclature.

In order to generate the logical combination, the man/machine interface is devised to propose in the form of a dropdown menu, a fourth empty or nonempty nomenclature of existing names of rules in the table 65. A fourth option to create a new rule name to be added in the logical combination is attached to the fourth nomenclature in the dropdown menu. The man/machine interface is devised to open a fourth window when the user selects the fourth create option, so as to add in the fourth nomenclature the rule name that the user enters into the window and to generate in column 60 of table 65, a verification expression which defines the rule named by the name entered. The fourth window is improved by the possibility offered to the user of specifying the natural or antinatural sense of the rule which is then stored in column 39 of table 65. The man/machine interface is devised to introduce each name of rule selected or added in the fourth nomenclature, as argument of a logical operator in the logical combination.

In order to generate the verification expression, the man/machine interface is devised to propose in the form of a dropdown menu, a fifth empty or nonempty nomenclature of existing names of protocol attributes, and to which is added a fifth option to create a new protocol attribute name to be brought into the verification expression. The man/machine interface is devised to open a fifth window when the user selects the fifth create option, so as to add in the fifth nomenclature the protocol attribute name that the user enters into the window. The man/machine interface is devised to concatenate in column 60 of table 65, a comparison operator followed by a typed value, with the protocol attribute name selected or added in the fifth nomenclature.

When the man/machine interface detects that the verification expression generated for a rule name added to the fourth nomenclature, is identical to a verification expression for a rule name preexisting in the table 65, the man/machine interface does not add the rule name in the fourth nomenclature but positions itself on the preexisting rule name and does not generate any new verification expression in column 60 of table 65 so that each rule is described once and once only in table 65.

When the man/machine interface detects that the logical combination generated for a filter name added to the third nomenclature, is identical to a logical combination for a filter name preexisting in the table 64, the man/machine interface does not add the filter name in the third nomenclature but positions itself on the preexisting filter name and does not generate any new logical combination in column 69 of table 64 so that each filter is described once and once only in table 64.

The man/machine interface coupled with the database 6 thus allows the user or makes it possible to choose to define flexibly the actions to be triggered on digital communication data and the semantic flows to which the data on which to trigger the actions belong. As explained hereinbelow, it will be those of the connections for which the protocol attributes validate the filters to which these data will be submitted.

In a particular manner in the system described with reference to FIG. 1, table 5 comprises in each row, a pointer to a data structure 50, 51, 52 devised to store states allocated to the current connection indexed in the corresponding row of table 5.

Each data structure 50, 51, 52, comprises a connections link table 53, a filter states table 54 and a rule states table 55. Each row of the table 53 is allocated to a different link table 61, 62, 63, of which an action name with the highest priority among the actions which are still able to be triggered, is indexed in column 49. With each action name indexed in column 49 is associated in column 48 a state, either valid, or indeterminate. Each row of the table 54 is allocatable to a different filter whose name is indexed in column 47. With each filter name indexed in column 47 is associated in column 46 a state, either valid, or invalid, or indeterminate. Each row of table 55 is allocatable to a rule whose name is indexed in column 45. With each rule name indexed in column 45 is associated in column 44 a state, either valid, or invalid, or indeterminate.

On creation of a row of table 5 for a new connection detected in the digital communication data, the link table 53 is initialized with an image which pictures all of the rows of the link tables 61, 62, 63 so as to contain in column 49 each action name of each link table 61, 62, 63, and in column 48 each associated filter name. Tables 54 and 55 are initially empty.

The configuration, represented in FIG. 6, of the tables 53, 54 and 55 is that during processing of a connection, the progression of which will be described subsequently.

The system described with reference to FIG. 1, comprises for each useable protocol, an interface of protocol attributes 40, 41, 42, 43. Each protocol attributes interface is allocated to a specific protocol. For this specific protocol, the protocol attributes interface is devised to extract from among the communication data, a parameter value such as specified in a protocol attribute which indicates this specific protocol as using this parameter. Advantageously, the man/machine interface is devised to ask the user to load a suitable protocol attributes interface when a protocol attribute name is added into the fifth nomenclature and when there exists no protocol attribute interface devised to restore a parameter value. The system is thus flexibly configurable so as to take account of any protocol architecture modification.

It will be noted that the definition of the actions and of the semantic flows with the aid of the database 6 on the one hand and the definition of the possible protocol architectures with the aid of the protocol attributes interfaces on the other hand are independently achievable.

Figure 4:
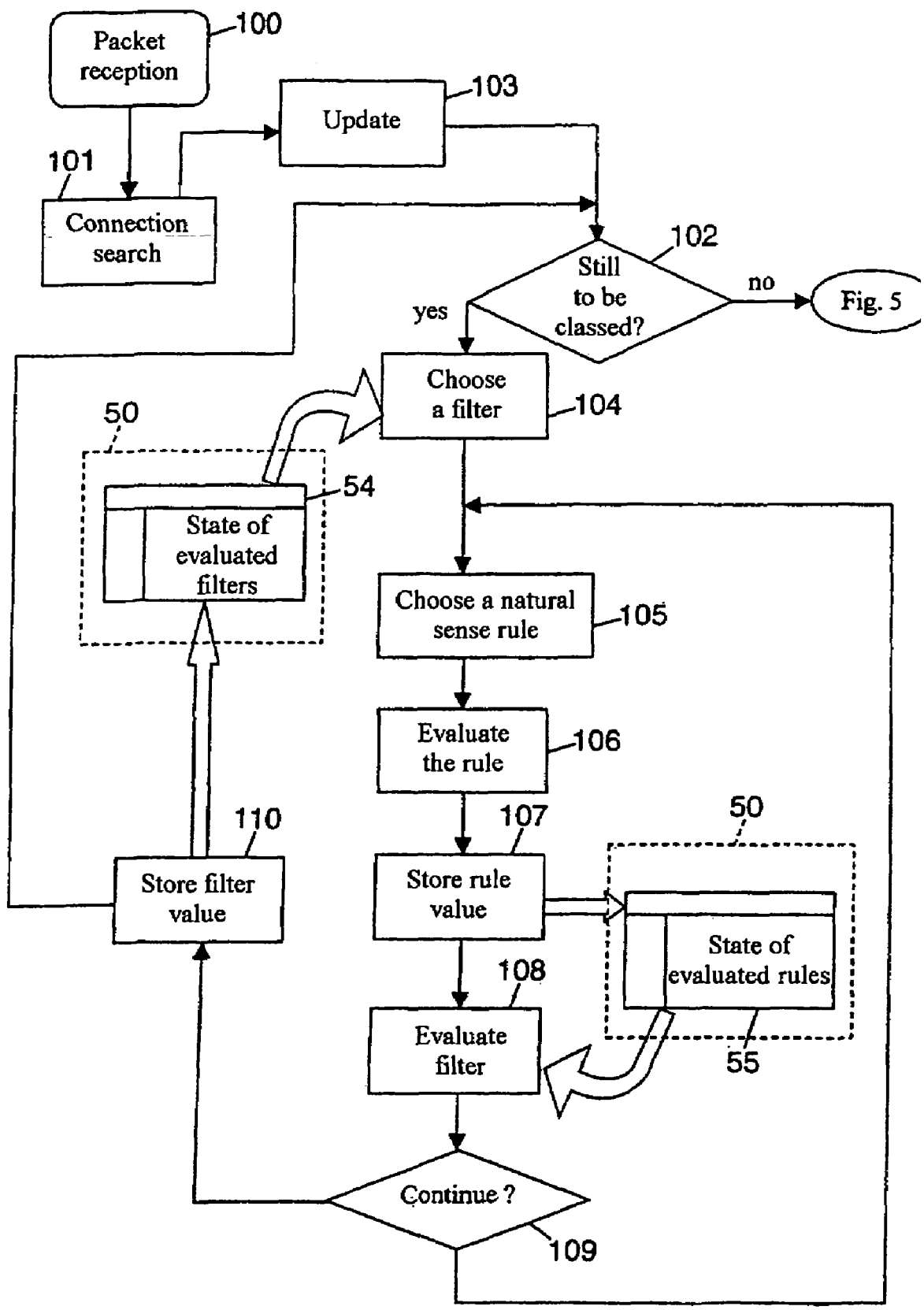
FIGS. 4 and 5 are logic flowcharts of method steps in accordance with the invention.
Figure 5:
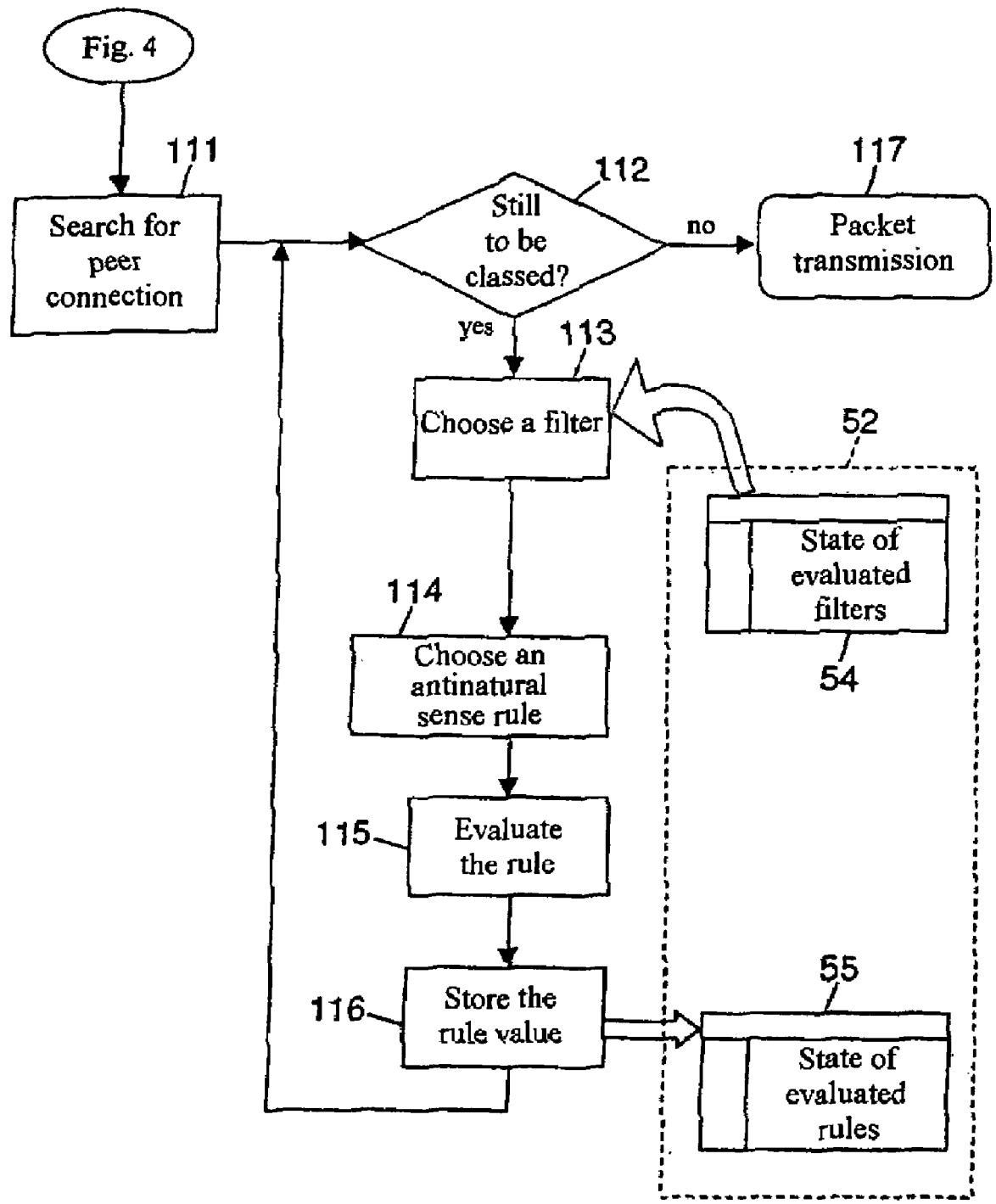

The filtering engine 1 is devised to read table 5 and the database 6, so as to read and write the data structures 50, 51, 52 and activate the protocol attributes interfaces 40, 41, 42, 43 in such a way as to execute the method described now with reference to FIGS. 4 and 5.

The method is described here for the particular case where the communication data are transmitted packetwise in a step 100. The advantage is the ability to process the communication data in real time as and when they are received packetwise without having to store these packets. The method can be adapted to global processing (batch processing) of communications data, for example, daily, the steps remaining substantially the same. The distinction is rather in the actions to be triggered, those of tables of firewall links and of service links, being more beneficial for real-time processing, those of tables of measurement links or of compression links, being as beneficial within the framework of real-time processing as within the framework of static processing.

When a packet reaches the filtering engine 1 in step 100, it is accompanied by a reference to the row of the table 5 which corresponds to the current connection to which the packet belongs.

The reference which accompanies the packet allows the filtering engine 1 to search in step 101 for the pointer to that one of the data structures 50, 51, 52 which is associated with the current connection. The reference 50 used in FIG. 4 is, for example, for the case where the data structure pointed at is the data structure 50 but the explanations which follow remain appropriate for any other data structure.

In an update step 103, the filtering engine deletes from the table 54 and from the table 55, all the rows whose state contained in column 46, respectively in column 44, is uncertain since the corresponding rules and filters are to be reevaluated for the current communication data.

In a step 102, the filtering engine 1 scans the table 53 row by row commencing with the first row. For each row scanned, the filtering engine 1 searches through column 47 of table 54 for the filter name referenced by column 48 of the row of table 53 scanned.

When no row of table 54 contains the filter name in column 47, the filtering engine 1 adds a row to the table 54 with the filter name in column 47. The current connection is then again to be classed as regards a semantic stream determined by the filter whose name is added in column 47. In this case, the filtering engine 1 triggers a succession of step 104 to 110 to evaluate the filter before returning to step 102.

When the row of table 54 contains the filter name with an invalid state (−1) in column 46, the filtering engine 1 deletes the row from the table 53 which contains this filter name in column 48. The filtering engine 1 then tests whether there exists a next row in table 53. If there exists no next row in table 53, the filtering engine 1 exits the process described with reference to FIG. 4 since there is no longer any need to class the current connection in terms of semantic flow. If there exists a next row in table 53, this row is scanned so as to continue to execute step 102 as described previously and subsequently.

When the row of the table 54 contains the filter name with an uncertain state (0) in column 46, the filtering engine 1 tests whether there exists a next row in the table 53. If there exists no next row in the table 53, the filtering engine 1 exits the process described with reference to FIG. 4 since there is no longer any need to class the current connection in terms of semantic flow. If there exists a next row in table 53, this row is scanned so as to continue to execute step 102 as described previously and subsequently.

When the row of the table 54 contains the filter name with a valid state (+1) in column 46, the filtering engine 1 deletes the rows of the table 53 which contain in column 49, action names of lower priority than that of the currently scanned row. The filtering engine 1 then tests whether there exists a next row in the table 53. If there exists no next row in the table 53, the filtering engine 1 exits the process described with reference to FIG. 4 since there is no longer any need to class the current connection in terms of semantic flow. If there exists a next row in the table 53, this row is scanned so as to continue to execute step 102 as described previously.

In step 104, the filtering engine 1 points to the row of the table 64 which contains the same filter name in column 68 as in column 47 of table 54 so as to obtain in column 69 the logical combination of rules that is required to evaluate the filter. The filtering engine 1 then triggers a succession of steps 105 to 109 for rules taken as arguments of logical operators in the logical combination, repeated until all the rules of the logical combination have been considered or until an evaluation of the filter on a valid or invalid deterministic state has been obtained.

In step 105, the filtering engine 1 searches through table 55 for the rows which contain the rule names in column 45 until it arrives at a rule name which is not contained in a row of the table 55.

When a rule name is not contained in a row of the table 55, the filtering engine 1 adds a row to the table 55 with the rule name in column 45. If the rule is of so-called antinatural sense, the filtering engine 1 places a value 0 of uncertain state in column 44 of the row since the data required for the evaluation of this rule are not present in the current connection but in the peer connection. If the rule is of natural sense, the filtering engine triggers step 106 for evaluating the rule.

In step 106, the filtering engine 1 accesses the row of the table 65 which contains in column 59 the same rule name as column 45 of the row added to the table 55, so as to load the verification expression which is associated in column 60. The filtering engine submits the protocol attribute name to that one of the protocol interfaces 40, 41, 42, 43 which is allocated to the protocol specified by the syntax of the protocol attribute. The protocol interface then searches through the current communication data for the value of the protocol attribute. If the protocol interface finds the value of the protocol attribute submitted, it transmits this value to the filtering engine and stores this value in a register dedicated to the current connection. If the protocol interface does not find the value of the protocol attribute submitted, it transmits to the filtering engine, a signal which indicates that the value is not found.

When the protocol interface transmits the signal which indicates that the value is not found, the filtering engine evaluates the rule as being in the uncertain state.

When the protocol interface transmits the value of the protocol attribute, the filtering engine evaluates the rule as being in the valid state if the value transmitted satisfies the condition of the verification expression and as being in the invalid state if the value transmitted does not satisfy the condition of the verification expression.

In step 107, the filtering engine stores the state of the rule evaluated in the corresponding column 44 of the table 55.

In the filter evaluation step 108, the filtering engine 1 applies the logical combination contained in column 69 to the rule states contained in column 60, in accordance with the truth tables 55, 56, 57, 58.

In step 109, the filtering engine 1 tests whether the state of the filter evaluated is uncertain and whether there remain rules to be evaluated for the logical combination of the filter.

In the case where the state of the filter evaluated is uncertain and there remain rules to be evaluated for the logical combination of the filter, the filtering engine returns to step 104, positioning itself on the next rule to be evaluated in the logical combination.

In the converse case, the filtering engine triggers step 110.

In step 110, the filtering engine stores the state of the filter evaluated in column 46 of table 54 before returning to step 102 to continue execution thereof.

When the filtering engine 1 exits the process described with reference to FIG. 4, it enters, in a more particularly advantageous manner, the process described with reference to FIG. 5. The process described with reference to FIG. 5 makes it possible to take account of the information items in the communication data which are useful for determining semantic flows in which to class the peer connection of the current connection.

In a step 110, the filtering engine searches for the peer connection indexed in table 5. Table 5 comprises in the row of the peer connection, a pointer to a different data structure from that of the current connection, let us assume to fix matters that the pointer is to the data structure 52.

A succession of steps 114 to 116 is triggered for each rule of so-called antinatural sense whose name is indexed in column 45 of table 55 of the data structure 52.

In step 114, the filtering engine 1 chooses a rule of antinatural sense which are to be evaluated or to be reevaluated. A consideration of the rules to be evaluated or to be reevaluated as being those whose state is uncertain, makes it possible to maintain good speed of processing by restricting the number of rules to be evaluated. A consideration of the rules to be evaluated or to be reevaluated as being all those of antinatural sense, makes it possible to take account of any modification of protocol attribute value which might change the state of the rule.

In the rule evaluation step 115, the filtering engine submits the protocol attribute name of the verification expression to the protocol interface allocated to the protocol specified by the syntax of the protocol attribute. If the protocol interface returns a protocol attribute value, the filtering engine calculates the state of the rule by applying the verification expression to the value returned. If the protocol interface does not return any protocol attribute value, the filtering engine leaves the state of the rule unchanged.

In step 116, the filtering engine 1 stores the state of the rule in column 45 of table 55 of the data structure 52.

So as to restrict the evaluation of rules of antinatural sense to only those rules necessary for completing the classification of the peer connection in one or more semantic flows, a step 112 is designed to determine whether the peer connection is still to be classed.

In step 112, the filtering engine searches through the table 54 of the data structure 52 for the filter names whose state in column 46 is uncertain. For each filter name whose state is uncertain, the filtering engine triggers a step 113. When the search through the table 54 has terminated, the filtering engine triggers a step 117.

In step 113 corresponding to the choice of a filter whose name is associated in table 54 with an indeterminate state, the filtering engine considers the names of rules of the logical combination associated with this filter name in the table 64 and executes the succession of steps 114 to 116 for each rule name of antinatural sense.

A connection's membership of a semantic flow may vary over time. This may for example occur in the case of multiplexing of several end-to-end connections on one and the same lower level connection or else of the transfer to a connection at a given moment of images and then at another moment of text related to its images with a different semantic meaning for the images and for the text.

The performance of the method according to the invention is boosted by the below-described improvements of step 103.

In the update step 103, the communication data contained in the packet are explored by each protocol interface 40, 41, 42, 43, having already been interrogated by the filtering engine 1 for the current connection to which the packet belongs. When the protocol interface detects a change of value for a protocol attribute whose value it has previously communicated to the filtering engine, the protocol interface notifies the filtering engine of the name of the protocol attribute for which the value has changed.

The filtering engine then determines the rule or rules which use this protocol attribute in table 65, the filter or filters which use this or these rules in table 64 and then each action whose name is associated with a filter name thus determined in the link table or tables 61, 62, 63.

For each action name thus determined, the filtering engine 1 decides to add or not to add a row to table 53 as a function of the criteria which follow.

When several actions of the link table, for example 61, may be triggered simultaneously, the filtering engine inserts into table 53, while complying with the order defined by the link table 61, a copy of the row which corresponds to the action name determined in table 61.

If a copy of this row already exists in table 53, the filtering engine deletes the corresponding filter row from the table 54 so as to instruct a new evaluation of the filter if required.

When a single action of the link table, for example 62 or 63, is triggerable, namely the highest priority action with the valid state or the default action, the filtering engine inserts into the table 53, while complying with the order defined by the link table 62, 63, a copy of the row which corresponds to the action name determined in table 61 if and only if the action determined is of higher priority than the triggerable action. If a copy of this row already exists in table 53, the filtering engine deletes the corresponding filter row in table 54 so as to instruct a new evaluation of the filter if required.

Step 117 is executed when all the rules of sense which require it have been evaluated in the process described with reference to FIG. 4 for the rules of natural sense and in a supplementary manner in the process described with reference to FIG. 5 for the rules of antinatural sense.

In step 117, the filtering engine transmits the packet received to the actions engine 2.

The actions engine 2 points to the table 53 of the data structure 50 of the current connection. As a function of the states associated in table 54 with the filter names associated in table 53 with the action names, the actions engine 2 decides on actions to be triggered or not to be triggered.

When several actions of the link table, for example 61, may be triggered simultaneously, the action engine triggers all the actions whose name is associated in table 53 with a filter name in the valid state in table 54 or when there exists no action whose name is associated in table 53 with a filter name in the valid state in table 54, all the actions whose name is associated in table 53 with a filter name in the uncertain state in table 54 or a default action according to a predefined triggering policy for this link table.

When a single action of the link table, for example 62 or 63, is triggerable, namely the action of highest priority with the valid state or the default action, the actions engine 2 triggers the action whose name is associated in table 53 with a filter name in the valid state in table 54 or when there exists no action whose name is associated in table 53 with a filter name in the valid state in table 54, the default action.

The actions engine triggers each action in accordance with the definition which is given in the database 6. As seen previously, certain actions triggered are liable to modify the content of the header or of the body of the packet. Thereafter, the actions engine 2 transfers to output 7, the packet having undergone the various actions triggered.

The invention claimed is:

1. A method for triggering by means of a digital processing device, at least one action on digital communication data when they belong to the same semantic flow for which said action is designed, wherein the method comprises:

feeding the device with at least one filter having three possible states which result from one or more conditions on one or more protocol attributes specified for said semantic flow, a valid state corresponding to protocol attribute values which confirm that said condition or conditions are satisfied, an invalid state corresponding to protocol attribute values which confirm that said condition or conditions are not satisfied, an uncertain state corresponding to an absence of protocol attribute values to confirm that said condition or conditions are or are not satisfied, each protocol attribute being specified by an ordered sequence of protocol names used in the semantic flow and by a parameter name conveyed by a protocol whose name is indicated in said ordered sequence of protocol names;

applying the three-state filter to said communication data as long as these data have not afforded protocol attribute values other than those from which said uncertain state of the filter results; wherein to apply the filter to said communication data, the method further comprises: dispatching one of said protocol attributes to a protocol interface allocated to the protocol indicated in the ordered sequence of protocol names, until the state of the filter is valid or invalid or until all the protocol attributes have been dispatched; searching through the communication data for the value of the specified parameter and transmitting this value to the digital processing device if it finds the former; and evaluating the state of the filter which corresponds to the value or to the absence of value transmitted by the protocol interface; and triggering said action when said valid state of the filter results from protocol attribute values afforded by the communication data; wherein said action includes one or more of encrypting, routing, signature actions, compression, decompression, aggregation, and a user-defined action applied to the digital communication data.

2. The method as claimed in claim 1, wherein each filter for feeding said digital processing device is defined by a logical combination of rules in a first table, each rule being defined in a second table by a verification expression comprising at least one comparison operator, an argument of which is the protocol attribute.

3. The method as claimed in claim 1, wherein to evaluate the state of the filter which corresponds to the value or to the absence of value transmitted by the protocol interface, the digital processing device evaluates the state of at least one rule in the logical combination as a function of the transmission of value and then the state given by the logical combination applied to the evaluated states of rules.

4. The method as claimed in claim 1 wherein the method further comprises a step in which the digital communication data are scanned so as to detect any change of value of a protocol attribute so as to make it possible to evaluate a change of state of the filter which corresponds to the change of value.

5. A computer system for triggering at least one action on digital communication data when they belong to the same semantic flow for which said action is designed, wherein the system comprises:

a digital processing device comprising a filtering engine and an actions engine;

a database for feeding the filtering engine with at least one filter having three possible states which result from one or more conditions on one or more protocol attributes specified for said semantic flow;

at least one data structure for cataloguing a valid state corresponding to protocol attribute values which confirm that said condition or conditions are satisfied, an invalid state corresponding to protocol attribute values which confirm that said condition or conditions are not satisfied, an uncertain state corresponding to an absence of protocol attribute values to confirm that said condition or conditions are or are not satisfied, each protocol attribute being specified by an ordered sequence of protocol names used in the semantic flow and by a parameter name conveyed by a protocol whose name is indicated in said ordered sequence of protocol names;

means for receiving communication data, useable by the filtering engine to apply each necessary filter to said communication data as long as these data have not afforded any protocol attribute value other than those from which said uncertain state of the filter results; and means of transmission of the communication data, useable by the action engine to trigger said action when said valid state is contained in the data structure; wherein said action includes one or more of encrypting, routing, signature actions, compression, decompression, aggregation, and a user-defined action applied to the digital communication data;

wherein the system comprises a protocol interface allocated to each useable protocol in the semantic flow, and configured to receive from the filtering engine, the protocol attributes defined for the protocol to which the protocol interface is allocated; the protocol interface being configured so as to search through the communication data for the value of the specified parameter and to transmit this value to the filtering engine if it finds the former; and the filtering engine being configured so as to evaluate the state of the filter which corresponds to the value or to the absence of value transmitted by the protocol interface.

6. The computer system as claimed in claim 5, wherein the database comprises a first table which contains a logical combination of rules for each filter, and a second table which contains for each rule, a verification expression comprising at least one comparison operator, an argument of which is the protocol attribute.

7. The computer system as claimed in claim 5, wherein to evaluate the state of the filter which corresponds to the value or to the absence of value transmitted by the protocol interface, the digital processing device is devised so as to evaluate the state of at least one rule in the logical combination as a function of the transmission of value and then the state given by the logical combination applied to the evaluated states of rules.

8. The computer system as claimed in claim 5, wherein the database comprises at least a third table containing several names of actions each designed for a different semantic flow with which a specific filter is associated.

* * * * *

UNITED STATES PATENT AND TRADEMARK OFFICE
CERTIFICATE OF CORRECTION

PATENT NO. : 7,596,626 B2  Page 1 of 1
APPLICATION NO. : 10/535380
DATED : September 29, 2009
INVENTOR(S) : Fdida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1071 days.

Signed and Sealed this

Twenty-eighth Day of September, 2010

David J. Kappos
*Director of the United States Patent and Trademark Office*